United States Patent [19]
Kelm

[11] Patent Number: 5,971,473
[45] Date of Patent: *Oct. 26, 1999

[54] ADJUSTMENT APPARATUS FOR A SUNROOF

[75] Inventor: Eckehart Kelm, Gilching, Germany

[73] Assignee: Meritor Light Vehicle System, Inc., Troy, Mich.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/024,733

[22] Filed: Feb. 17, 1998

Related U.S. Application Data

[63] Continuation of application No. 08/537,684, Jan. 19, 1996.

[30] Foreign Application Priority Data

Apr. 23, 1993 [DE] Germany .............................. 93 06 187

[51] Int. Cl.⁶ .................................................... B60J 7/047
[52] U.S. Cl. ...................... 296/223; 296/216.03; 296/224
[58] Field of Search ................. 296/223, 216.01–216.03, 296/224, 221

[56] References Cited

U.S. PATENT DOCUMENTS

| | | | |
|---|---|---|---|
| 5,026,113 | 6/1991 | DiCarlo et al. | 296/221 |
| 5,447,355 | 9/1995 | Kelm . | |
| 5,765,908 | 6/1998 | Kelm | 296/223 |

FOREIGN PATENT DOCUMENTS

| | | |
|---|---|---|
| 353695 | 2/1990 | European Pat. Off. . |
| 403388 | 12/1990 | European Pat. Off. . |
| 2591953 | 6/1987 | France . |
| 33 11 428 | 10/1983 | Germany . |
| 3345122 | 7/1984 | Germany . |
| 3536184 | 11/1986 | Germany . |
| 3715268 | 1/1988 | Germany . |
| 3801881 | 8/1988 | Germany . |
| 3802379 | 8/1988 | Germany . |
| 39 03 035 | 8/1990 | Germany . |
| 8802552 | 5/1990 | Netherlands . |

OTHER PUBLICATIONS

International Search Report of Jul. 6, 1994.
German Priority Application Search Report of Jan. 13, 1994.

*Primary Examiner*—Dennis H. Pedder
*Attorney, Agent, or Firm*—Vickers, Daniels & Young

[57] ABSTRACT

An adjustment apparatus for a sunroof includes a cover support element (19), a guide element (13*a*, 13*b*), a carriage element (3), and means of control (4 through 7) for the adjustment of the cover piece. The cover support element (19), with the cover piece (8) can be tilted around a first cam (7*a*) and displaced. The means of control join the cover piece with the carriage element in a manner relative to each other such that they can be displaced along the aforementioned longitudinal direction.

A simple design of the control system is achieved by virtue of the fact that a first connecting link (2) is provided, in which the cam (7*a*) is guided, the carriage element and the cover support element are joined with each other, by means of a second connecting link (5) and a second cam (7*b*) that is guided in it, in such a way that the first cam (7*a*) also moves along the second connecting link (5) when the second cam (7*b*) is moved in the second connecting link (5), and the first and the second guide curves (2 and 5) always form an angle with one another relative to the first and second cams (7*a* and 7*b*).

15 Claims, 5 Drawing Sheets

ADJUSTMENT APPARATUS FOR A SUNROOF

This patent application is a continuation of application Ser. No. 08/537,684 filed on Jan. 19, 1996 now U.S. Pat. No. 5,765,908, and incorporated herein by reference.

BACKGROUND OF THE INVENTION

1. Area of the Invention

The invention relates to an adjustment apparatus for a sunroof that exhibits at least one cover piece for the optional closing and at least partial uncovering of a roof opening in a solid roof area of a vehicle, particularly an automobile, in which the roof opening is delimited by a base piece with side pieces that define a longitudinal direction and that lie opposite one another, and in which the cover piece is displaceable along the aforementioned longitudinal direction. An adjustment apparatus of this type includes at least one cover support element, one guide element for a carriage element that serves as the drive for the cover piece, and a means of control for the adjustment of the cover piece. The cover support element, of which there is at least one, is rigidly joined with the cover piece and can be tilted (swiveled) around a first cam that runs cross-wise to the aforementioned longitudinal direction and that is placed near the front edge of the cover, and can be displaced along the aforementioned longitudinal direction by means of a cam. The guide surface, of which there is at least one, extends along the aforementioned longitudinal direction and is secured to the base piece. The carriage element, of which there is at least one, is guided in a displaceable fashion along the aforementioned guide surface and thereby along the aforementioned longitudinal direction and moves the cover piece. The means of control for adjusting the cover piece join the cover piece to the carriage element in a manner in which they can be moved relative to one another along the aforementioned longitudinal direction.

One preferred area of application for the invention is the so-called "spoiler roof". These are sliding roofs for vehicles, especially automobiles, that include a movable, cover-like closing element for a roof opening and are constructed in such a way that when a drive apparatus is actuated, for example, a crank, first the rear end of the closing cover raises up so that it is tilted and then, following that, the closing cover is displaced approximately horizontally while retaining the tilted position.

The area of application of the invention includes not only those sunroofs which are built in at the factory during the manufacture of the vehicle, but also those sunroofs which can be installed afterwards.

2. Description of the State of the Art

A "spoiler roof" with an adjustment apparatus of the type described at the beginning is known from DE 33 11 452 C2. In the case of this known adjustment apparatus, the transport carriage and the guide/swivel cam of the cover support element in same are rigidly placed in the frame of the sunroof, and are guided and displaced in guide elements that extend completely straight. The transport carriage is joined only indirectly, but not directly, with the cover support element, and specifically, by means of a swiveling lever that is controlled by the transport carriage and that is secured in a swiveling manner to the cover and to the cover support element on one side, and is guided at its opposite end in a displaceable fashion in the above-mentioned guide element. This lever represents a means of height adjustment at the rear and includes, in addition, a locking element that prevents the cover piece from being displaced to the rear while it is being tilted upward.

This locking element, together with the above-mentioned guide element, is used in addition to ensure that the cover that has been displaced to the rear cannot be tilted back into the closed position as it is being moved forward, but rather, only after it has reached its position of most forward movement, that is, a position in which it is completely above the opening in the roof. This adjustment apparatus thus requires a large number of components with complicated shapes, and to that extent, distinguishes itself little from adjustment apparatuses for other known spoiler roofs.

A different adjustment apparatus for a "spoiler roof" is known from DE 38 01 881 C2. Although this known adjustment apparatus dispenses with one lever of the type that was described above in connection with DE 33 11 452 C2, the number of necessary components and the complexity of the shapes, as well as the multiple sequences of movements of the components, is no less than is the case in accordance with DE 33 11 452 C2, because independent components are required for holding the cover in its position of most forward movement during the tipping up of the cover and for preventing the tipping down of the cover as it is being moved forward. In the case of this known adjustment apparatus, the cover support element—in contrast with the adjustment apparatus in accordance with DE 33 11 452 C2—is not guided directly in a guide that is provided in the sunroof frame and supported by a corresponding guide cam, but instead, the cover support element is entirely supported by the transport carriage at two points that lie one behind the other, and is controlled by the transport carriage with respect to its swiveling and height adjustment movements.

Disclosure through Reference

With regard to the components and the means of control that are known for adjustment apparatuses for spoiler roofs and that are made use of, or if need be, can be made use of by the adjustment apparatus in accordance with the invention, for one, the technical disclosure through reference that is known by means of the already cited documents DE 33 11 452 C2 and DE 38 01 881 C2 is included in this patent. In addition, DE 40 37 975 A1 is also included through reference, because it is already known by means of that document that the adjustment apparatus for a spoiler roof can be housed in a center brace that divides the roof opening, and not in the side pieces of the frame.

SUMMARY OF THE INVENTION

The goal of the invention consists in creating a sunroof of the type mentioned at the beginning that possesses a simply constructed system of control.

A particular goal of the invention consists in being able to dispense with separate locking elements during the tipping movement of the cover and during the sliding movement of the cover.

This task is resolved in accordance with the invention by means of the fact that a first connecting link is provided that extends essentially along the aforementioned longitudinal direction, is fastened to the base piece, and defines a first guide curve, and in which the cam of the cover support element (first cam) is guided.

the carriage element and the cover support element are joined, by means of a second connecting link that defines a second guide curve and by means of a second cam that is guided in the second connecting link, in such a way that the first cam moves along or parallel to the second guide curve relative to the carriage element when the second cam is moved within the second connecting link, and the first and the second guide curves, in all working positions of the carriage element that are provided along the guide surface, form an angle with one another of such a kind that the positions of the first and second cams are always uniquely defined, not only along the first connecting link but also along the second connecting link as well, and the carrying along of the cover support element by the carriage element is assured.

In the case of the adjustment apparatus in accordance with the invention, control cams are thus guided simultaneously on two guide curves that run in opposite directions and whose point of intersection uniquely defines the horizontal and vertical position of the cover support element, that is, of its cams. The forming of the angle by the two guide curves ensures that the transport carriage moves the cover in the desired direction with each movement of the transport carriage. In conjunction with that, the distance covered by the cover support element can amount, per unit of distance covered, to between 0 and 100 percent of the distance covered by the carriage. Advantageous configurations of the invention are described in the sub-claims.

BRIEF DESCRIPTION OF THE DRAWINGS

A preferred implementation example of the invention is described in detail in the following by means of the drawing. The following are shown.

DESCRIPTION OF A PREFERRED FORM OF IMPLEMENTATION

In the preferred form of implementation, a spoiler roof that exhibits the invention includes a base piece that is configured as a frame 1 that is fixed in the roof and that it could be possible to retrofit, a carriage element that is configured as a transport carriage 3, and a cover piece that is configured as cover 8. In the implementation example, the frame 1 is provided in order that it can be installed in a corresponding roof opening 31 in a solid roof surface 32 of a vehicle such as an automobile. The cover 8 is intended to close the roof opening 31, and is mounted by means of the transport carriage 3 in a manner such that it can be tilted and moved with reference to the frame 1. In the following, for the sake of simplicity it will be assumed that the frame 1 prescribes the horizontal plane.

The frame 1 is essentially shaped in the form of a rectangular with rounded corners, and limits to the inside the free opening area in the vehicle roof. Near the edge of the opening, the frame 1 carries an encircling horizontal support surface 18 for the cover 8 in the form of a resilient sealing profile section.

The frame 1 exhibits two parallel side pieces 11 that define a longitudinal direction S. The longitudinal direction S coincides with the direction of displacement of the cover 8. Each side piece 11 includes a straight, symmetrical, right/left mirror-image multifunction profile section 11', preferably made of metal. Formed in it are two optionally usable guide channels 12' for a drive cable 12 (shown in FIG. 3). The guide channel that runs in the longitudinal direction S opens, in the form of a longitudinal groove 12", towards the inside to the multifunction profile section 11', which is—roughly speaking—U-shaped in cross-section. Because of that, a drive connection element 33 (see FIG. 3) can engage a groove in the the transport carriage 3 that is configured as a coupling location and bring about the displacement of the transport carriage 3 in the longitudinal direction S during fore and aft movements. For this purpose, the drive cable 12 is joined—in a manner that is itself well-known—with a hand-operated crank drive, an electric motor, or a similar kind of drive mechanism, that moves the drive cable 12 back and forth in its guide channel.

Figure 4:
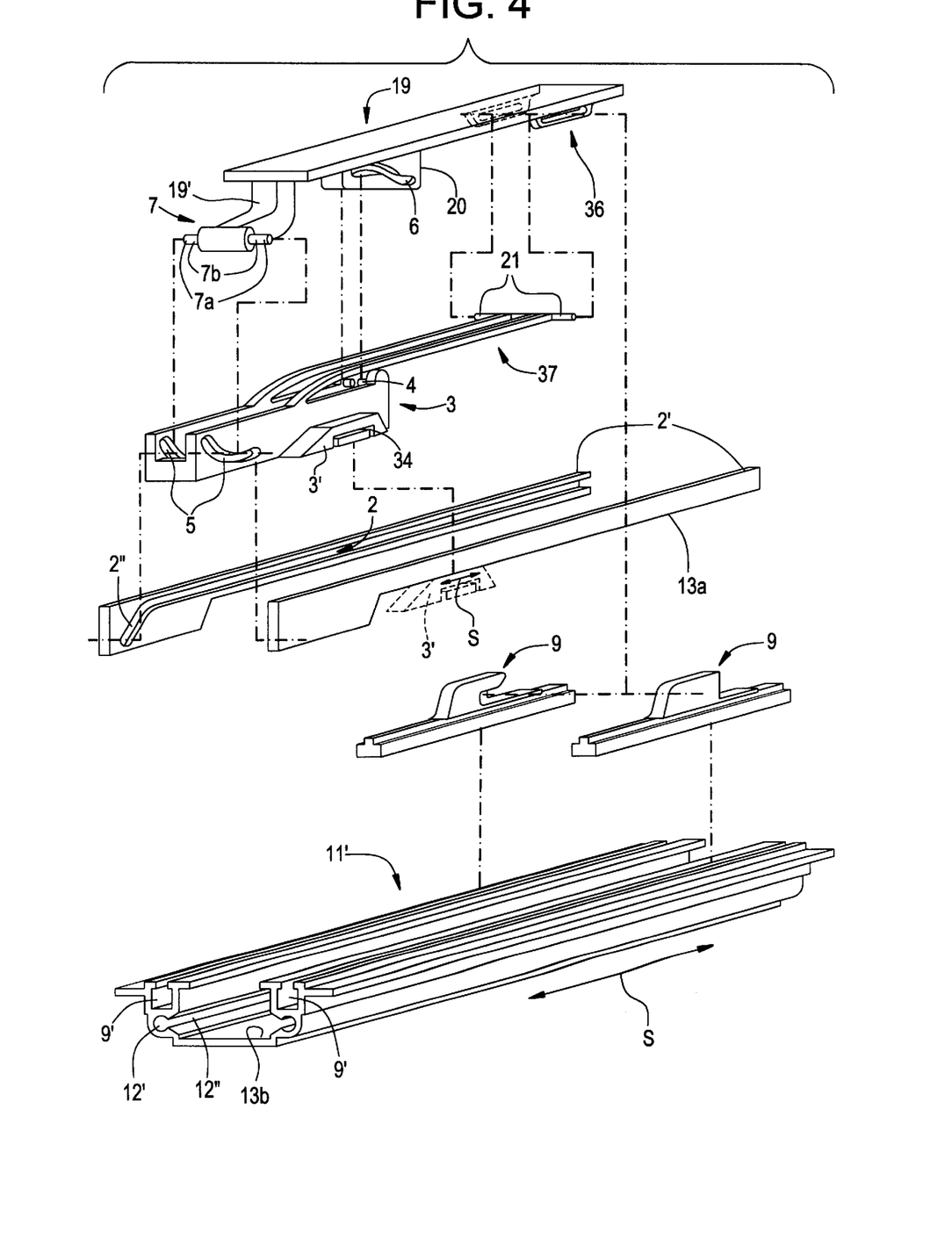

For its guidance in a tilt-free manner, the transport carriage 3 exhibits, along the longitudinal direction S on both of its longitudinal sides, projections 3' that possess upper and lower guide surfaces 3" and 3'". Corresponding with this is inside the multifunction profile section 11' a straight guide surface that exhibits upper and lower guide surfaces 13a, 13b. The latter are formed, on the one hand, from a flat underside of a guide profile section 2' that can be inserted into the multifunction profile section 11', and on the other, from an inner surface of the multifunction profile section 11'. The paired guide profile 2', which is, in particular, configured as a formed plastic part, exhibits a first connecting link 2 that defines a first guide curve 2'. This is configured as a groove and climbs steeply in the longitudinal direction S, in a, when viewed in the direction of opening, that is, essentially along the longitudinal direction S of the cover piece 8, (front) section 2'. After this, it transitions into a direction that is essentially parallel to the longitudinal direction S. The steep climb takes place at an angle of about 60°. It is perfectly possible for this climb to be steeper, even 90° if so desired, but it can also be flatter as well, for example, 40°. The subsequent course of the connecting link could, of course, drop off after passing through a maximum, but a course that is parallel to the longitudinal direction S or that climbs slightly is preferable. The manner of working of the connecting link 2 will be described in more detail in connection with the following Figures. The guide profile sections 2' are easily inserted into the recesses that are provided for them on the inner side of the edges of the multifunction profile section 11', and allow room over most of their length for the tilt-free guiding of the transport carriage by means of the side projections 3'. This can be seen especially clearly in the middle part of FIG. 4.

The transport carriage 3 is provided with a second connecting link 5, which defines a second guide curve and is in the form of a slot. This slot falls (when observed from the front of the roof opening 31 in the longitudinal direction S, that is, always from the left in the drawing) very steeply at first and subsequently an a much flatter manner, namely, at an angle of about 5° relative to the longitudinal direction S. The course of this slot thus follows a strongly monotonic falling course in the direction of opening of the cover 8. The manner of working of this second connecting link will also be described in more detail later.—As was the case with the projections 3', the second connecting links 5 and all of the additional parts of the transport carriage 3 are configured in pairs and as mirror images of each other.

The transport carriage 3 exhibits at its, when viewed in the direction of opening, back end, a cam 4 that is oriented at a right angle to the longitudinal direction S, that is, a pair of cams that are oriented coaxially and that face each other. The cam 4 is a component of a means of control, itself well-known, to bring about a change in height, and in particular, to tilt the cover 2 towards the front. To do this, the cam 4 works in conjunction with a plate-like projection 20 that is fastened to the cover 8 and with a slot 6 that is provided in the projection, in which slot the cam 4 works in the manner of an additional connecting link guide that is comprised of a connecting link pin and a connecting link groove. This means of control is known in all of its details from DE 38 01 881 C2, among others, and thus does not need to be explained further here.

Of course, in order to reduce the friction of the cams that are being guided in the connecting links 2, 5 and 6, appropriate measures, such as putting swiveling rollers, can be used such as are—likewise—described in DE 38 01 881 C2 for this purpose. The cover 8 is comprised in known fashion of a flat or slightly curved panel made of metal, glass, plastic, or something similar. The cover 8 can be tilted, that is, swiveled, around an axis that runs transversely to the longitudinal direction S, by means of a cover support element that is rigidly joined with the cover. For this purpose, the cover support element exhibits a bracket 19' that goes vertically downward and then kinks forward at an angle. This is provided with a pair of first cams 7a that protrude from it sideways and that encompass the tilt axis of the cover 8. These cams are displaced in the first connecting link 2 along the first guide curve, which is determined by this connecting link.

At the same time, there are provided on the bracket 19' second cams 7b, which lie further to the inside than the first cams 7a, but on the same tilt axis, and are guided in the first connecting links 5 relative to the transport carriage 3.—In accordance with the preferred special case that is shown in the implementation example, the cams 7a and 7b thus are all provided on a common cam 7. In principle, however, the second cams 7b can also be placed on the cover support element 19 displaced with reference to the tilt axis of the cover and thus with reference to the first cams 7a as well. In that case, the control of the movement of the tilt axis of the cover 8 takes place jointly by means of both cam/connecting link guides 7a, 2 and 7b, 5. This will be explained in detail later.

In the former case, in order to simplify assembly, the cover support element 19 also carries the above-mentioned projection 20, as well as a slot-like displacement guide 36, which is configured in pairs, for the rear end of a tension element 37, which is secured to the transport carriage 3 in a swiveling fashion, and which carries a locking part 21 that works in conjunction with a buttress 9 to lock the cover in its rear area. The buttress 9, which is configured in a paired fashion, can be inserted into and secured in undercut longitudinal grooves 9' at the upper end of the U-segment of the multifunction profile section 11'. It basically consists of formed plastic parts that are configured as symmetrical mirror images (see FIG. 4 in particular).

The function of the adjustment apparatus in accordance with the invention is explained in the following.

Figure 1:
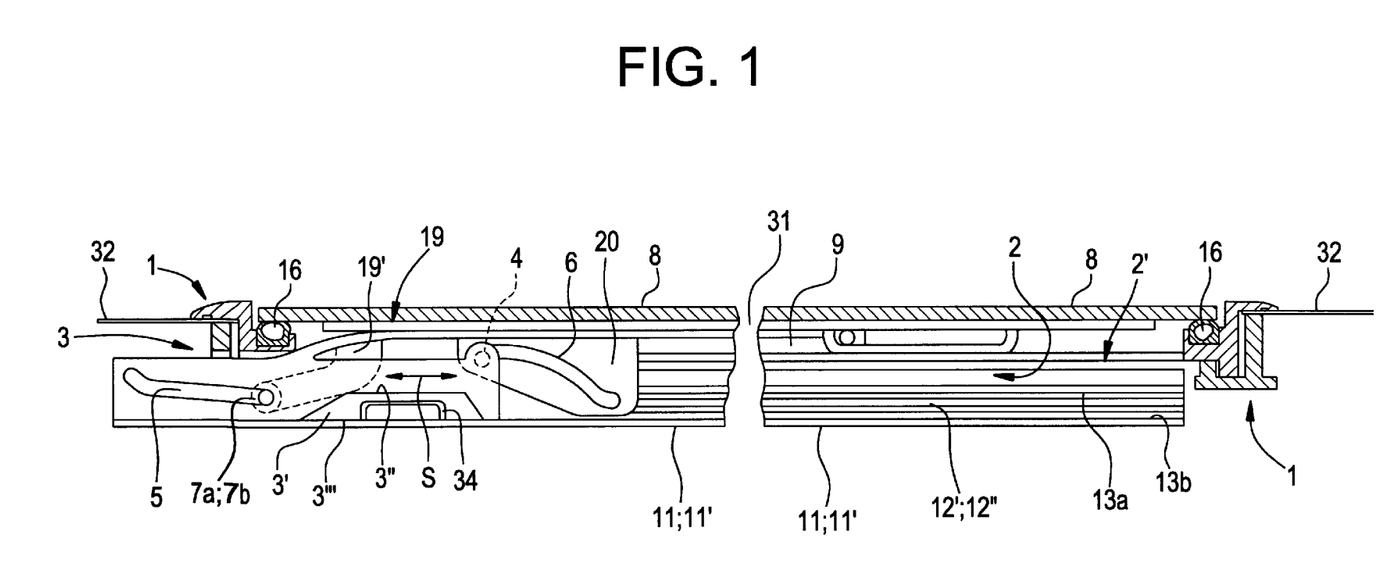
FIG. 1 A section view of a sunroof (spoiler roof) in accordance with the invention with a closed cover, whereby the plane of the section is a vertical plane parallel to the direction of displacement, that is, parallel to the longitudinal direction, FIG. 2a A section view of the same spoiler roof along the same section plane as in FIG. 1, in which the cover and the transport carriage are shown in a second operating position, FIG. 2b An additional section view of the same spoiler roof along the same section plane as in FIG. 1 and 2a, in which the cover and the transport carriage are shown in a third operating position, FIG. 3 A section view (partial) of the same spoiler roof, whereby the plane of the section is a vertical plane perpendicular to the to the direction of displacement (section along the line III—III in accordance with FIG. 2a), FIG. 4 A perspective representation (exploded view) of the main functional parts of the adjustment apparatus for the same spoiler roof, and FIGS. 5a to 5e A sequence of functions during the open/close procedure of the same spoiler roof in a partial detail representation of the main functional parts of the adjustment apparatus.
Figure 2A:
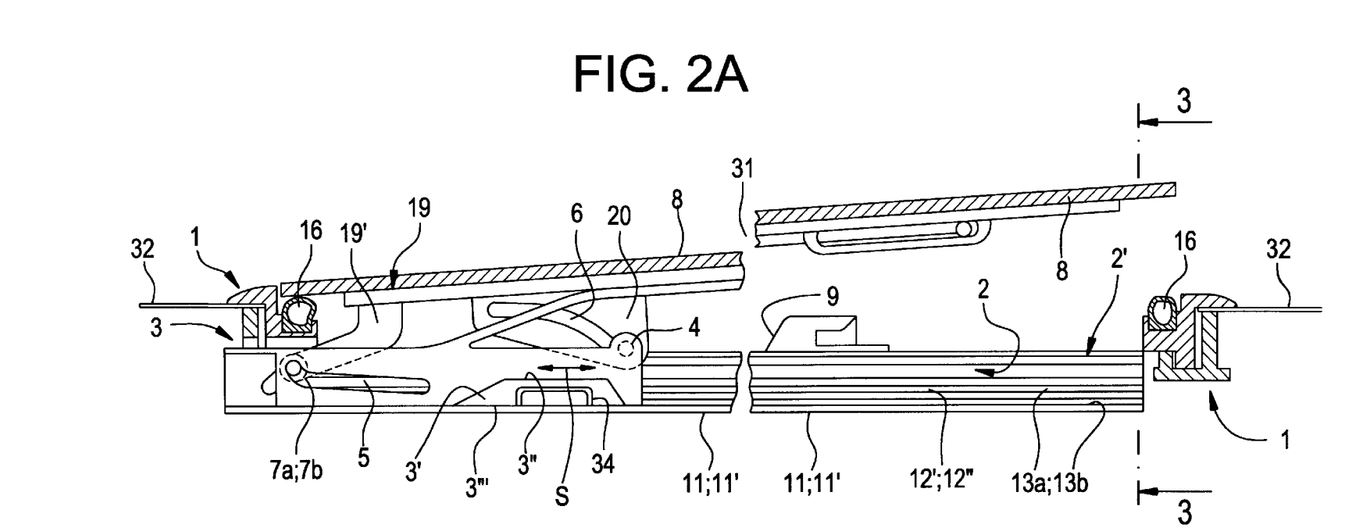
Figure 2B:
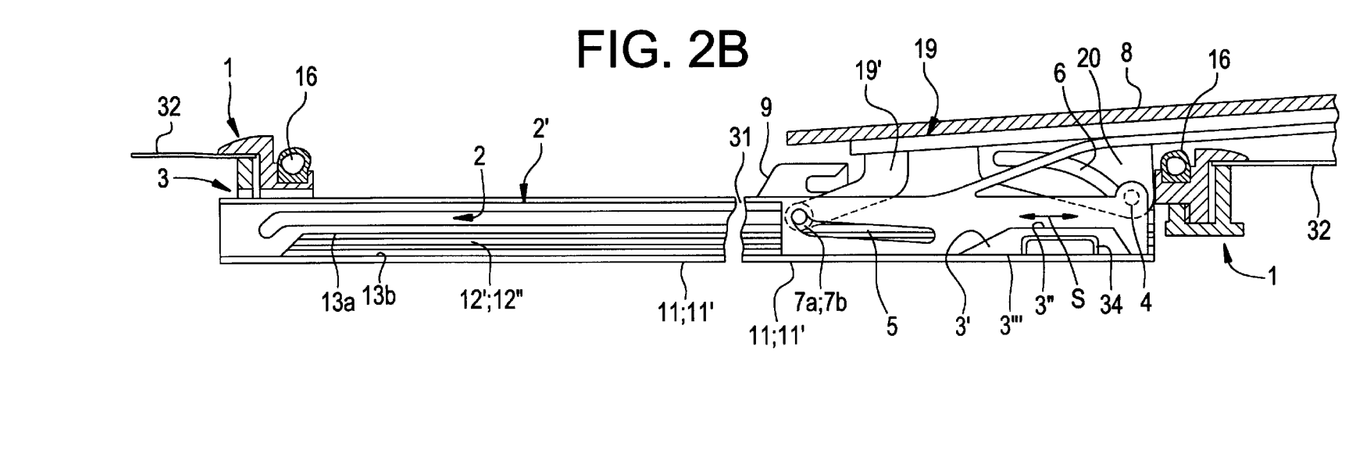
Figure 3:
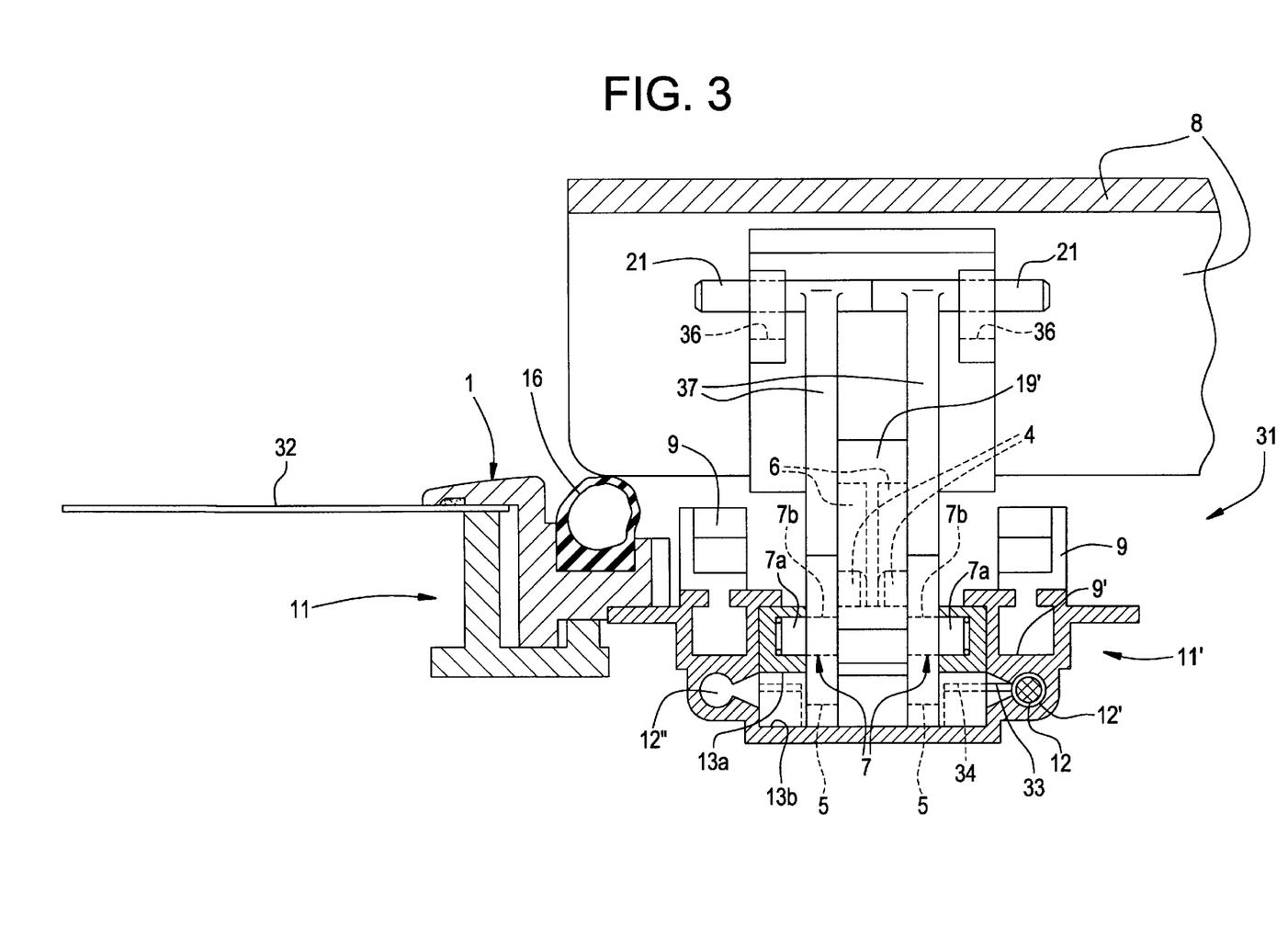

As can best be seen in FIG. 3, the cam 7 engages, by means of its outer segments 7a, with both sides of the bracket 19' through the first connecting link 5 all the way into the connecting link 2, and is guided along this first connecting link 2. The cam sections 7b engage only with the second connecting link 5. All of the cams 7 are guided simultaneously through the first connecting link 2 and through the second connecting link 5. The sequence of FIGS. 1, 2a and 2b is made clear in principle by the geometrical arrangement of the first and second connecting links 2 and 5 relative to one another, and by the positions of the cams 7 and the various positions of the cam 4 of the means of control 4, 8 in the slot 6. For reasons of clarity, however, the function of the adjustment apparatus is shown by means of the sequence of FIGS. 5a through 5e.

Figure 5A:
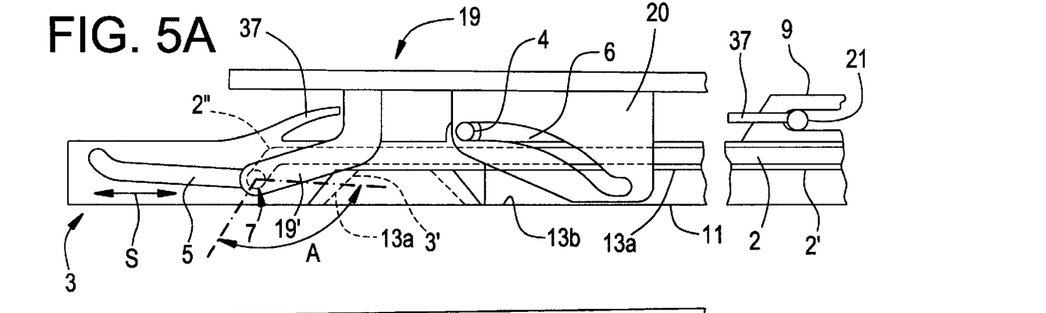
Figures 5B, 5C, 5D:
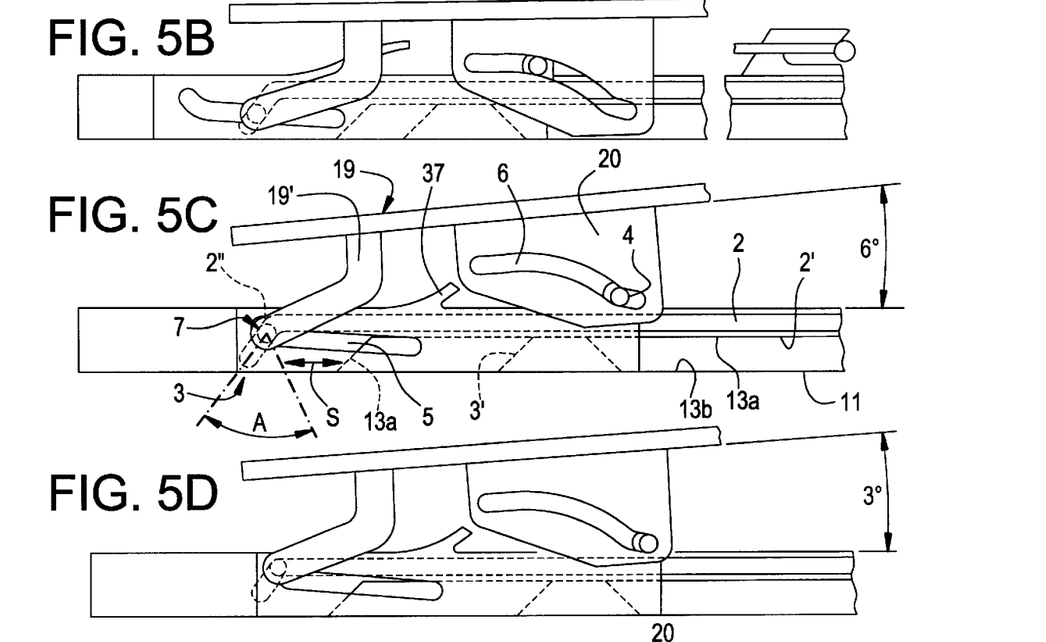
Figure 5E:
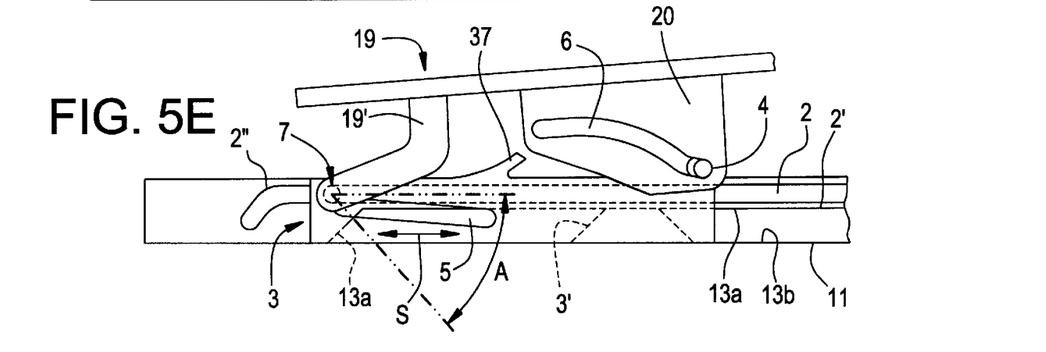

By virtue of the fact that the second cam 7b is guided in the connecting link 5 that is present in the guide slot 3, the transport carriage 3 is linked by means of its connecting link 5, the second cam 7b, and the bracket 19' in a driving arrangement with the cover 8. By virtue of the fact that the the first cam 7a is likewise fastened to the bracket 19', this first cam 7a also moves along the second guide curve relative to the transport carriage 3, and specifically, when the second cam 7b is moved within the second connecting link 5. The beginning of this cam movement relative to the guide slot 3 is shown in FIG. 5a, and the end of this relative movement is shown in FIG. 5d. FIGS. 5b and 5c show intermediate positions.

Now, the first connecting link 2 and the second connecting link 5—when viewed from the longitudinal direction S—exhibit a course of such a type that, in all of the working positions along the guide surface 13a, 13b of the transport carriage 3, they form an angle A relative to the first and second cams 7a and 7b. Because of that, and because of an appropriate positioning of the first and second connecting links with each other, it is possible to achieve the fact that the positions of the cams 7a and 7b are always uniquely determined, both along the first connecting link 2 as well as along the second connecting link 5. In the case of the implementation example at hand, in which the first and second cams 7a and 7b are oriented coaxially, it must prevent the first and second connecting links from overlapping in a parallel oriented position at any position of the transport carriage 3, and the common cam 7 from being in this overlap area. In that event, a forward and back movement of the transport carriage would not lead to a unique cam position.

In order to ensure that the common cam 7 is not clamped in a fixed fashion between the two connecting links 2 and 5 during a forward and back movement of the transport carriage 3, a too-small angle A is to be avoided. An angle A of between 30° and 150° is as a rule completely sufficient to prevent any jamming of this nature. Greater angles, preferably between 70° and 110°, are particularly preferable. In general, the principle holds true that the bringing along of the cover support element 19 by the moving transport carriage 3 must always be ensured.

Since in the implementation example shown, the first connecting link 2 and the second connecting link 5 guide the common cam 7 at the same time, the position of the common cam 7 for a given position of the transport carriage 3 thus must always lie at the point of intersection of the two connecting links. This prevents the cover 8 from changing its position without the transport carriage 3 being moved. In this way it is additionally ensured that the transport carriage 3 can take the cover 8 along in the rear area of connecting link 2 in which it runs horizontally, without further safety and locking measures being necessary, that is, in these cover displacement positions, the cover can be pushed forward without it tilting back into its closed position before it has reached its most forward position of displacement.

In the closed position that is shown in FIG. 1 and in FIG. 5a, the common cam 7 is located in the lowest position of the front section 2" of the first connecting link 2. At the same time, the common cam 7 is located in the lowest position of the second connecting link 5 in the guide carriage. If, as a result of the actuation of a drive, the drive cable now begins to move the transport carriage 3 to the rear in its guide surfaces 13a, 13b parallel to the longitudinal direction S, it is guided by the relatively slight slope of the connecting link 5 on the one hand and the comparatively steep slope of the section 2' of the connecting link 2 on the other as a result of the fact that, in spite of a very considerable displacement of the transport carriage 3, the cover support element 19 is slightly lifted, but only very slightly moved to the rear. The steeper that the section 21" climbs, the less that the cover 8 moves to the rear at the same time. Since in this part of the carriage movement the slot 6 of the means of height alteration runs almost exactly horizontally, and in any case, with only a very slight upward climb, the rear edge of the cover is, in any case, also raised only very slightly by means of this carriage movement. This phase of the movement also benefits the rear cover locking mechanism, in that the locking part 21, which is joined with the transport carriage 3 in a compression-resistant, extension-resistant manner, can be pushed out of the buttress 9 at the free end of the tension and compression element 37. This process has for the most part been completed in the carriage position shown in FIG. 5b.

Even though a locking element that can be released by the movement of the transport carriage and that the cover piece retains at first in the most forward position is not provided, the cover with its cover support element 19 remains in the most forward position of displacement by itself in the carriage position shown in FIG. 5c, because the course of the section 2" of the first connecting link 2 automatically restricts it.

Since during this phase of the movement the cam 4 moves quickly to the rear and down in the slot 6, between the positions shown in FIGS. 5b and 5c, the cover is raised at its rear edge significantly more strongly than at its front edge. The raising at the front edge is sufficient to prevent too severe a pressure or friction loading of the front cover seal 16 (see FIG. 2a). In addition, it can be seen from FIGS. 5c and 5d that the cover is at first tilted in a relatively steep ventilation position, while the displacement of the cover is carried out with an advantageously smaller cover inclination.

Only beginning with the transport carriage position shown in FIG. 5d does a further sliding back of the transport carriage 3 lead to a displacement of the entire cover 8 to the rear that is practically as fast. Beginning with this carriage position that is shown in FIG. 5d, the cam 7b lies at the front end of the connecting link 5 and the cam 4 at the rear end of the connecting link 6, and specifically, during the entire remaining course taken by the carriage, which ends only with the rearmost carriage position shown in FIG. 2b and allows a comparatively extensive opening of the roof opening 31.

Since the swiveling mobility of the tension/compression element 37 relative to the transport carriage 3 is implemented by means of a heat-elastic formation of this element, this element can carry out the tilting movement of the cover with no problem and without causing a problem. In place of this, a pure swivel joint between the tension/compression element and the transport carriage is, of course, also conceivable. Since in this case an angle has to be assumed between the tilted up cover and the tension/compression element, a cam/claw link can also be selected as the joint, in which the claw legs are long enough to remain engaged with the cam even when the front edge of the cover is raised. In this case, the tension/compression element can always lie parallel on the cover 8 in a displaceable fashion. The displacement path of the tension/compression element along the cover is only as long as the length of the connecting link 5 is, measured in the longitudinal direction S.—A cover lock of that type without the use of the two connecting links that are oriented at an angle to each other for the cams 7a/7b can also be used expediently and helpfully.

When the connecting link 2 climbs or falls only slightly in its rear area relative to the longitudinal direction S, this brings about—assuming a sufficiently vertical cam movement in the connecting link 5—a slight falling or lifting of the rear edge of the cover with the further displacement of the cover towards the rear. In this way, wind noise, for example, can be influenced. In the horizontal segment of the connecting link 2, the position of the cam 7 relative to the connecting link 5, and thus the canted position of the cover as well, remains unchanged. A displacement of the transport carriage 3 in this area brings about as a result a horizontal displacement of the cover 8 with retention of the tilt angle, until the cover has reached the position shown in FIG. 2b. Upon activation of the drive apparatus in the reverse direction, the transport carriage 3 moves from the rear towards the front. The process described above then exactly reverses itself. In conjunction with this, it is useful if the connecting link 5 drops relatively steeply in its frontmost area so that the driving force of the transport carriage that is working horizontally on the cam 7 is as great as possible, and the force component that is directed vertically downward is as small as possible.

The transport carriage 3 is thus the only movable functional part between its guide surfaces 13a, 13b and the cover 8. This not only reduces the susceptibility to failure and the play, it also makes possible an especially space-saving design.

In a modification that is not shown of the form of implementation described above, a first cam that is rigidly joined with the cover is guided only in the first connecting link, while the second cam is indeed likewise rigidly joined with the cover, but is displaced with regard to the first cam. This results in the fact that the second connecting link does not intersect with the first connecting link in the present positions of the first and second cam, but is positioned with a parallel displacement that corresponds to the displaced cam positions. The remaining components are the same as those described above. In this form of implementation the second connecting link thus likewise defines a guide curve for the first cam with regard to the transport carriage on which the first cam is running, when the second cam moves from one end of the second connecting link 5 to the other end of this connecting link 5. In accordance with that, the position of the first cam is determined by the point of intersection of this second guide curve with the first connecting link, while the second connecting link does not necessarily cross the first connecting link.

Further modifications of the implementation example described above and shown in the figures can provide for the fact that the connecting link of the means of height alteration are allocated to the transport carriage and the cover cam that engages with it. The positions of the common cam and of the first and second cams, along with the positions of the first and second connecting links can be placed to the rear, and the cam and the slot of the means of height alteration can be placed to the front, that is, the two connecting link guides are thus exchanged with each other. The sequence of movements when opening the cover, and in particular, the transition between the individual phases opening and closing the cover, can be changed or modified by means of an appropriate change in the shape of the connecting link, with nothing further being necessary.

In accordance with the present invention, a sliding roof can also be implemented in which the cover is made up of a number of individual covers, each of which tilts and displaces during opening as described above. To do this, each cover piece is joined with a transport carriage in the manner described above. Alternatively, individual cover elements can also be joined with one another by means of parallelogram linkage.

Finally, instead of guiding the cover at the side pieces of the frame, it is also possible to guide it at a center brace, as is known from DE 40 37 975 A1, among others. When this is done, a multifunction profile section (as is described by making reference to the drawings), for example, can be used as the center brace.

I claim:

1. Adjustment apparatus for a sunroof for the optional closing and partial uncovering of a roof opening in a solid roof area of a vehicle by a cover piece, the roof opening being delimited by a base piece with side pieces that define a longitudinal direction and that lie opposite one another, and in which the cover piece is displaceable along the longitudinal direction, comprising along each side piece:

a cover support element that is rigidly joined with the cover piece, said cover support element having a front end portion and a longitudinally opposite rear end portion, and a first cam portion at said front end portion extending crosswise to the longitudinal direction, a first connecting link in the side piece having front and rear ends and comprising a longitudinally extending slot receiving and guiding said first cam portion and having a first guide curve at the front end thereof, said first cam portion and said first connecting link allowing tilting of said cover support element and longitudinal displacement of the tilted cover support element relative to said side piece, a guide surface that extends along the longitudinal direction and is formed in said side piece, a carriage element that is slidably displaceable along and guided by said guide surface and has front and rear end portions, said cover support element and said carriage element having a slidably and pivotally interengaging second cam portion and second connecting link joining said carriage element and said cover support element for tilting and longitudinal displacement of said cover support element relative to said carriage element at said front portion thereof, and said cover support element and said carriage element having a slidably and pivotally interengaging third cam portion and third guide link for joining said carriage element and said cover support element for tilting and longitudinal displacement of said cover support element relative to said carriage element at said rear end portion of the carriage element.

2. The adjustment apparatus of claim 1 wherein said first cam portion moves along said second connecting link relative to said carriage element when said second cam portion is moved within the slot of said second connecting link.

3. The adjustment apparatus of claim 1, wherein the cover piece moves above the solid roof area when displaced along the longitudinal direction.

4. The adjustment apparatus of claim 1, wherein the cover piece is in the fully closed position when said carriage element is in its front most displaced position through longitudinal sliding movement.

5. The adjustment apparatus of claim 1, wherein said first cam portion and said second cam portion are coaxial.

6. Adjustment apparatus for a sunroof for the optional closing and partial uncovering of a roof opening in a solid roof area of a vehicle by a cover piece, the roof opening being delimited by a base piece with side pieces that define a longitudinal direction and that lie opposite one another, and in which the cover piece is displaceable along the longitudinal direction, comprising:

at least one cover support element that is rigidly joined with the cover piece, said cover support element having a front end portion and a longitudinally opposite rearward portion, and a first cam portion at said front end portion which runs crosswise to the longitudinal direction, said first cam portion allowing tilting and longitudinal displacement of said cover support element, at least one guide surface that extends along the longitudinal direction and is formed in said base piece, at least one carriage element that is guided in a displaceable fashion along the guide surface and that moves the cover piece, said carriage element including first support means for supporting said cover support element at said front end portion and second support means for supporting said cover support element at said rear end portion, said first and second support means allowing tilting of said cover support element, a first connecting link in the base piece comprising a longitudinally extending section having a first guide curve therein in which the first cam portion is guided, a second cam portion that is guided in a second guide curve of a second connecting link for joining the carriage element and the cover support element, said second cam portion and said second guide curve forming said first support means at said front end portion, a third cam portion that is guided in a third guide curve of a third connecting link for joining the carriage element and the cover support element, said third cam portion and said third guide curve forming said second support means at said rearward portion.

7. The adjustment apparatus of claim 6, wherein the first cam portion moves along the second guide curve relative to the carriage element when the second cam portion is moved within the slot of the second connecting link.

8. The adjustment apparatus of claim 6, wherein the cover piece moves above the solid roof area when displaced along the longitudinal direction.

9. The adjustment apparatus of claim 6 wherein the cover piece is in the fully closed position when said carriage element is in its front most displaced position through longitudinal sliding movement.

10. The adjustment apparatus of claim 6, wherein said first cam portion and said second cam portion are coaxial.

11. Adjustment apparatus for a sunroof for the optional closing and partial uncovering of a roof opening in a solid roof area of a vehicle by a cover piece, the roof opening being delimited by a base piece with side pieces that define a longitudinal direction and that lie opposite one another, and in which the cover piece is displaceable along the longitudinal direction, comprising:

- at least one cover support element that is rigidly joined with the cover piece, said cover support element having a front end portion, an intermediate and a longitudinally opposite rear end portion, and a first cam portion at said front end portion which runs crosswise to the longitudinal direction, said first cam portion allowing titling and longitudinal displacement of said cover support element,
- at least one guide surface that extends along the longitudinal direction and is formed from said base piece,
- at least one carriage element that is guided in a displaceable fashion along the guide surface and that moves the cover piece, said carriage element including support means for supporting and tilting said cover support element at both said front end portion, intermediate and said rear end portion,
- a first connecting link in the base piece comprising a longitudinally extending section having a first guide curve therein in which the first cam portion is guided,
- a second cam portion that is guided in a second guide curve of a second connecting link for joining the carriage element and the cover support element, said second cam portion and said second guide curve forming said support means at said front end portion,
- a third cam portion that is guided in a third guide curve of a third connecting link for joining the carriage element and the cover support element, said third cam portion and said third guide curve forming intermediate support means between said front and rear end portions
- said support means of both said front end, intermediate and rear end portions allowing tilting of said cover support element.

12. The adjustment apparatus of claim 11, wherein the first cam portion moves along the second guide curve relative to the carriage element when the second cam portion is moved within the slot of the second connecting link.

13. The adjustment apparatus of claim 11, wherein the cover piece moves above the solid roof area when displaced along the longitudinal direction.

14. The adjustment apparatus of claim 11, wherein the cover piece is in the fully closed position when said carriage element is in its front most displaced position through longitudinal sliding movement.

15. The adjustment apparatus of claim 11, wherein said first cam portion and said second cam portion are coaxial.

* * * * *